(12) United States Patent
Shakouri et al.

(10) Patent No.: US 12,065,555 B2
(45) Date of Patent: Aug. 20, 2024

(54) ELECTROSTATIC-BASED METHODS AND SYSTEMS FOR CONTROL OF RHEOLOGICAL BEHAVIOR

(71) Applicant: UNIVERSITY OF SOUTH CAROLINA, Columbia, SC (US)

(72) Inventors: Abolfazl Shakouri, Columbia, SC (US); Horie Adabi Firouzjaie, Columbia, SC (US); Marjorie Nicholson, Columbia, SC (US); John R. Regalbuto, Columbia, SC (US)

(73) Assignee: UNIVERSITY OF SOUTH CAROLINA, Columbia, SC (US)

( * ) Notice: Subject to any disclaimer, the term of this patent is extended or adjusted under 35 U.S.C. 154(b) by 166 days.

(21) Appl. No.: 17/703,193

(22) Filed: Mar. 24, 2022

(65) Prior Publication Data

US 2022/0306841 A1 Sep. 29, 2022

Related U.S. Application Data

(60) Provisional application No. 63/165,322, filed on Mar. 24, 2021.

(51) Int. Cl.
*C08L 1/02* (2006.01)
*C08K 3/22* (2006.01)
*C08K 9/00* (2006.01)
*B82Y 40/00* (2011.01)

(52) U.S. Cl.
CPC .......... *C08L 1/02* (2013.01); *C08K 3/22* (2013.01); *C08K 9/00* (2013.01); *B82Y 40/00* (2013.01); *C08K 2003/2241* (2013.01)

(58) Field of Classification Search
CPC ..... C08L 1/02; C08K 3/22; C08K 2003/2241; B82Y 40/00
See application file for complete search history.

(56) References Cited

U.S. PATENT DOCUMENTS

2011/0284225 A1* 11/2011 Lord ............... C09K 8/685
166/305.1

OTHER PUBLICATIONS https://d1wqtxts1xzle7.cloudfront.net/44178055/Cellulose_Nanoparticles_as_Modifiers_for20160328-9954-i71py3-libre.pdf?1459207175=&response-content-disposition=inline%3B+filename%3DCellulose_Nanoparticles_as_Modifiers_for.pdf&Expires=1698688406&Signature=JMOSgXxoE8FcJZuo25daA5HMfdjVUMsx7-qOJbs-EQzMuoCq (Year: 2015).*

Alfa Colorpaint Dispenser, TiO2, Jul. 11, 2018. Retrieved Feb. 10, 2023 from website https://www.alfadispenser.com/2018/07/11/titanium-dioxide-tio2-how-much-is-enough/.

Anton Paar, The Influence of Particles on Suspension Rheology, Wiki, 11 Pages. Retrieved Feb. 10, 2023 from website. https://wiki.anton-paar.com/en/the-influence-of-particles-on-suspension-rheology/.

(Continued)

*Primary Examiner* — Ling Siu Choi
*Assistant Examiner* — Olga Lucia Donahue
(74) *Attorney, Agent, or Firm* — DORITY & MANNING, P.A.

(57) ABSTRACT

Methods to control the flow behavior of non-Newtonian materials are described. Methods can increase the shear-thinning behavior of non-Newtonian materials such as aqueous suspensions, polymer melts and solutions, etc. Methods include induction of electrostatic charges to the surface of particles, e.g., nanostructures, held in suspension in the materials. The suspensions include different types of particles having different point of zero charge. Electrostatic charges are induced through adjustment of the pH of a suspension containing the particles, thereby modifying rheological characteristics of the material.

17 Claims, 10 Drawing Sheets

(56) References Cited

OTHER PUBLICATIONS

Grishkewich et al., Recent Advances in the Application of Cellulose Nanocrystals, Current Opinion in Colloid & Interface Science, vol. 29, 2017, pp. 32-45.

Islam et al., Cellulose Nanocrystal (CNC)—Inorganic Hybrid Systems: Synthesis, Properties and Applications, Journal of Materials Chemistry B, vol. 6, 2018, 864-883.

Tran et al., Understanding the Self-Assembly of Cellulose Nanocrystals—Toward Chiral Photonic Materials, Advanced Materials, 1905876, vol. 32, Issue 41, Oct. 15, 2020, 15 Pages. Retrieved Feb. 10, 2023 from website https://doi.org/10.1002/adma.201905876.

\* cited by examiner

| Stage 1 – Main Effect Estimates | | | | |
|---|---|---|---|---|
| Term | Estimate | Std. Error | t Ratio | Prob > \|t\| |
| $C\_TiO_2$ | -0.047 | 0.0075 | -6.32 | 0.0015* |
| pH | 0.0918 | 0.0075 | 12.262 | < .0001* |
| $C\_CNC$ | -0.114 | 0.0075 | -15.22 | < .0001* |
| Statistic | Value | | | |
| RMSE | 0.028 | | | |
| DF | 5 | | | |
| ☑ Quadratic Terms Obey Strong Heredity | | | | |
| ☑ Interactions Obey Strong Heredity | | | | |

| Combined Model Parameter Estimates | | | | |
|---|---|---|---|---|
| Term | Estimate | Std. Error | t Ratio | Prob > \|t\| |
| Intercept | 0.5501 | 0.0229 | 24.05 | < .0001* |
| $C\_TiO_2$ | -0.047 | 0.0073 | -6.479 | 0.0003* |
| pH | 0.0918 | 0.0073 | 12.589 | < .0001* |
| $C\_CNC$ | -0.114 | 0.0073 | -15.63 | < .0001* |
| $C\_TiO_2*pH$ | 0.0276 | 0.0089 | 3.1054 | 0.0172* |
| $C\_TiO_2*C\_CNC$ | 0.0193 | 0.0089 | 2.1689 | 0.0667 |
| $pH*C\_CNC$ | 0.0131 | 0.0089 | 1.479 | 0.1827 |
| $C\_TiO_2*C\_TiO_2$ | -0.028 | 0.0197 | -1.422 | 0.1981 |
| $pH*pH$ | -0.033 | 0.0197 | -1.654 | 0.1422 |
| $C\_CNC*C\_CNC$ | 0.0785 | 0.0197 | 3.9789 | 0.0053 |
| Statistic | Value | | | |
| RMSE | 0.0273 | | | |
| DF | 7 | | | |

FIG. 15

ELECTROSTATIC-BASED METHODS AND SYSTEMS FOR CONTROL OF RHEOLOGICAL BEHAVIOR

CROSS REFERENCE TO RELATED APPLICATION

This application claims filing benefit of U.S. Provisional Patent Application Ser. No. 63/165,322, having a filing date of Mar. 24, 2021, and entitled "Electrostatic Effects as a Tool to Adjust Rheological Behavior," which is incorporated herein by reference for all purposes.

BACKGROUND

The pumping of fluids is necessary in many industrial applications. Pumping of non-Newtonian materials can be especially problematic due to their non-linear rheological characteristics. Non-Newtonian materials are those that exhibit a variable viscosity with applied stress, e.g., particle suspensions, molten polymers, and gels. Common non-Newtonian materials include salt solutions, as well as many household items, e.g., ketchup, toothpaste, corn starch, shampoo, etc. Non-Newtonian materials are also common in industry, such as polymer melts as may be present in product formation applications, and various fluids and suspensions used in oil field applications such as for enhanced oil recovery (EOR), water production control, conformance control, and control of leak-off and back-flow characteristics during hydraulic fracturing. The rheology of non-Newtonian materials is of particular interest as the shear-thinning (decrease in viscosity with shear strain) and shear-thickening (increase in viscosity with shear strain) characteristics of these materials must be taken into account during use and can cause difficulties if the necessary conditions are not met to obtain desired rheological characteristics of the materials. For instance, if suitable shear stress is not applied to a non-Newtonian material, the resulting rheological characteristics (e.g., dynamic or intrinsic viscosity) can negatively affect pressure, pumping, and back-flow characteristics of an entire system.

What is needed in the art are methods that can be used to control and tune the rheological behavior of non-Newtonian materials and to thereby provide a route for desirable flow characteristics, for instance, to provide improved flow in production applications or increased accessibility in porous media as in oil recovery. Improved rheological control methods could, for example, reduce the operation costs of drilling fluids and increase oil production, as well as improve the production of polymeric products such as thin films for use in food packaging.

SUMMARY

According to one embodiment, disclosed is a method for controlling a rheological characteristic of a non-Newtonian material. For instance, a method can include forming a suspension that includes a liquid, a first particle, and a second particle. In some embodiments, the first and second particles can be nanostructures. In some embodiments, the liquid can be the non-Newtonian material. In some embodiments, the liquid can be a Newtonian liquid (e.g., water) and a suspension of the liquid and the first particle can be the non-Newtonian material. The first particle exhibits a first point of zero charge (PZC) and the second particle exhibits a second, different PZC.

The method can also include adjusting the pH of the suspension such that the pH of the suspension is greater than the PZC of both the first particle and the PZC of the second particle or is less than the PZC of both the first particle and the PZC of the second particle. The resulting pH-controlled suspension can exhibit improved shear-thinning behavior as compared to the non-Newtonian material.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment may be used in another embodiment to yield a still further embodiment.

Disclosed are methods that can be used to adjust the flow behavior of non-Newtonian materials, and in one particular embodiment, to increase the shear-thinning behavior of a non-Newtonian material. The methods can be used in one embodiment to cause a drilling fluid to be more shear-thinning, which desirably lowers the pump pressure and increases the accessibility of the fluid, for instance, in the case of oil recovery. The methods are not limited to such use, however, and can be utilized in other applications that involve fluid flow of a non-Newtonian material. For instance, and without limitation, disclosed methods can find utilization in 3D printing of hydrogels or other non-Newtonian materials, or in polymer formation processes, e.g., polymer casting of thin films having desirable properties, e.g., formation of antibacterial or self-cleaning thin films. In one particular embodiment, disclosed methods can be utilized to control the rheological characteristics of a non-Newtonian aqueous suspension.

Disclosed methods are based upon the electrostatic interaction among different particles with different points of zero charge (PZC). According to the method, electrostatic charges can be induced to the surface of particles by adjusting the pH of a suspension containing the particles. More specifically, through formation of a suspension that includes different types of particles that have PZCs that differ from one another and then by controlling the pH of the suspension, the electrostatic interactions between the different particles can be tuned which can, in turn, affect the rheological properties of the suspension.

As utilized herein, the term "particle" is not intended to refer to a structure of any particular shape. A "particle" can have any shape, e.g., spherical, oval, rod shaped, triangular, polygonal, square, rectangular, amorphous, toroid, etc. In general, the dimensions of a particle can be on the micrometer or nanometer scale, e.g., microstructures or nanostructures of any shape.

Figure 1:
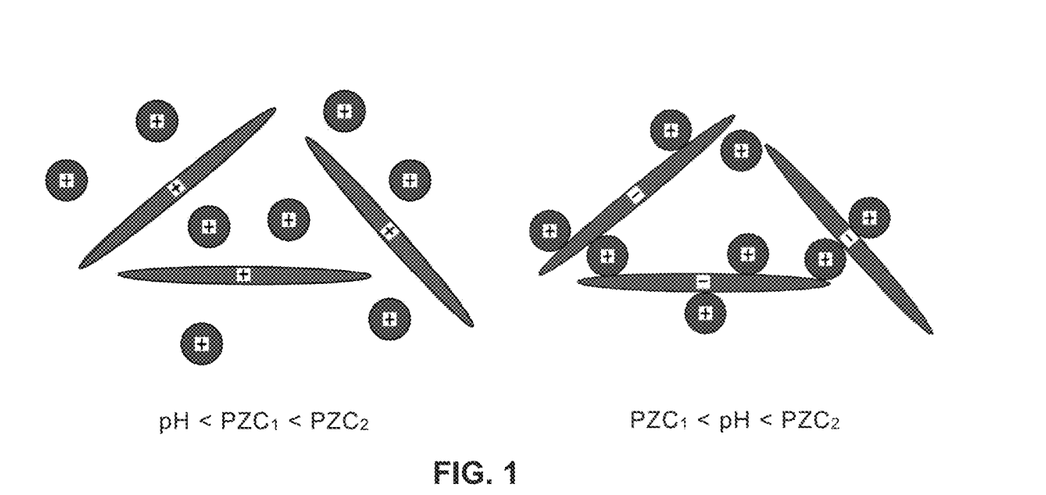
FIG. 1 schematically illustrates electrostatic interactions of particles having different point of zero charge (PZC) under different pH conditions.
Figure 2:
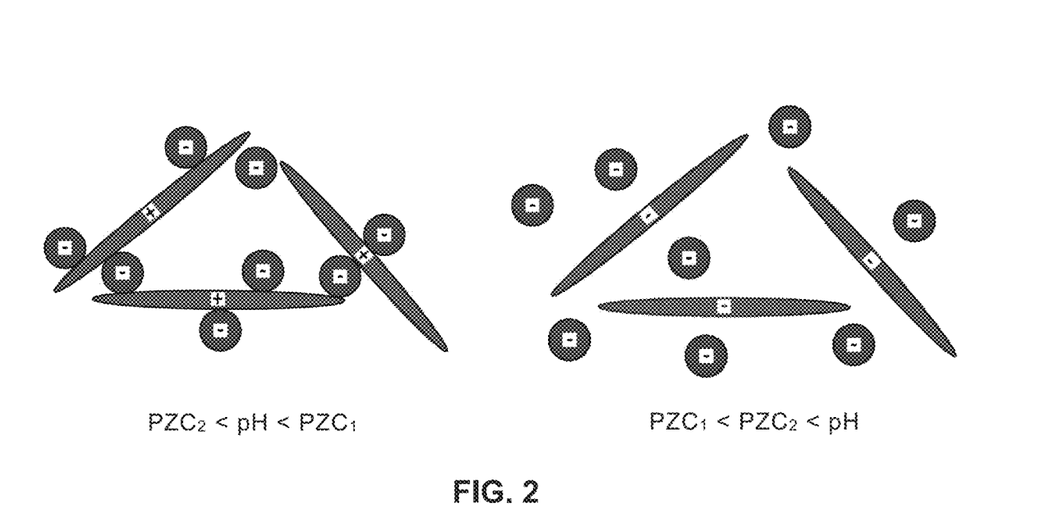
FIG. 2 schematically illustrates electrostatic interactions of particles having different point of zero charge (PZC) under different pH conditions.

FIG. 1 and FIG. 2 schematically illustrate the relationship between particles of different PZC under different pH conditions. In the illustrated embodiment of FIG. 1, the PZC of the elongated particles $PZC_1$ is lower than that of the more spherical particles $PZC_2$. As indicated, when the pH of a suspension containing both particles is lower than both $PZC_1$ and $PZC_2$, both particles will exhibit a positive surface charge, and thus, be repelled from one another. When the pH is between the PZCs of the two particles, the first particle will exhibit a negative surface charge while the second particle will exhibit a positive surface charge, and the particles will be attracted to one another.

FIG. 2 illustrates a similar situation, but in this embodiment, the PZC of the elongated particles $PZC_1$ is greater than that of the round particles $PZC_2$. As such, when the pH of the suspension is between the PZCs of the two particles, the first particles will exhibit a positive surface charge and the second particles will exhibit a negative surface charge, and the particles will be attracted to one another. When the pH of the suspension is greater than the PZCs of both particles, the particles will exhibit a negative surface charge and the different particles will be repelled from one another, as shown.

Through application of the disclosed methods, the power index (n) of a non-Newtonian material can be tuned in a wide range, and in particular, can be tuned to increase the shear-thinning characteristics of the material. Dynamic viscosity (η) can be utilized as an indirect representation of the power index (n). As such, in some embodiments, a change in shear-thinning characteristics of a material can be determined by examination of a change in dynamic viscosity with change in shear rate of the material.

In one embodiment, a method is designed to improve the shear-thinning characteristics of a non-Newtonian material. In this embodiment, upon identical increase in shear rate conditions, the dynamic viscosity of a pH-controlled suspension, including the material as described, will decrease to a greater extent than will the dynamic viscosity of the material alone under the same change in shear rate. By way of example, upon application of shear rates of 1 $s^{-1}$ and 5 $s^{-1}$, a pH-controlled suspension as described can exhibit a decrease in dynamic viscosity (as measured in centipoise) by an amount that is about 10% or greater, about 20% or greater, or about 30% or greater in some embodiments, as compared to the decrease in dynamic viscosity of the non-Newtonian material alone under the same shear conditions. In embodiments, the decrease in dynamic viscosity of the suspension can be from about 10% to about 80% greater than the decrease in dynamic viscosity of the non-Newtonian material alone, such as from about 20% to about 70% greater, or from about 40% to about 60% in some embodiments.

Similarly, in those embodiments in which a method is desired to modify the shear-thickening characteristics of a non-Newtonian material, a change in shear rate conditions of a suspension as described can lead to a change in dynamic viscosity (as measured in centipoise) by an amount that is about 10% or greater, about 20% or greater, or about 30% or greater in some embodiments, as compared to the change in dynamic viscosity of the non-Newtonian material alone under the same change in shear conditions. In embodiments, the change in dynamic viscosity of the suspension can be from about 10% to about 80% greater than the decrease in dynamic viscosity of the non-Newtonian alone, such as from about 20% to about 70% greater, or from about 40% to about 60% in some embodiments.

In addition to utilization of the electrostatic effects to control rheological conditions of a non-Newtonian material, further "fine-tuning" of the rheological characteristics of a material can be attained through selection of other characteristics of the suspension. For instance, in one embodiment, particles of the suspension can be selected that have a particular shape, e.g., aspect ratio, width, length, etc. For example, selection of particles having a particular aspect ratio can be utilized to further control the rheological characteristics of the suspension. As known, for a suspension including particles having an aspect ratio (length:width) of from about 1:1 to about 20:1, the intrinsic viscosity of the suspension can be expressed by the following function:

$$\eta=2.5+0.123(R-1)^{0.925}$$

in which
  η is the intrinsic viscosity of the fluid, and
  R is the aspect ratio of the particles.

Figure 3:
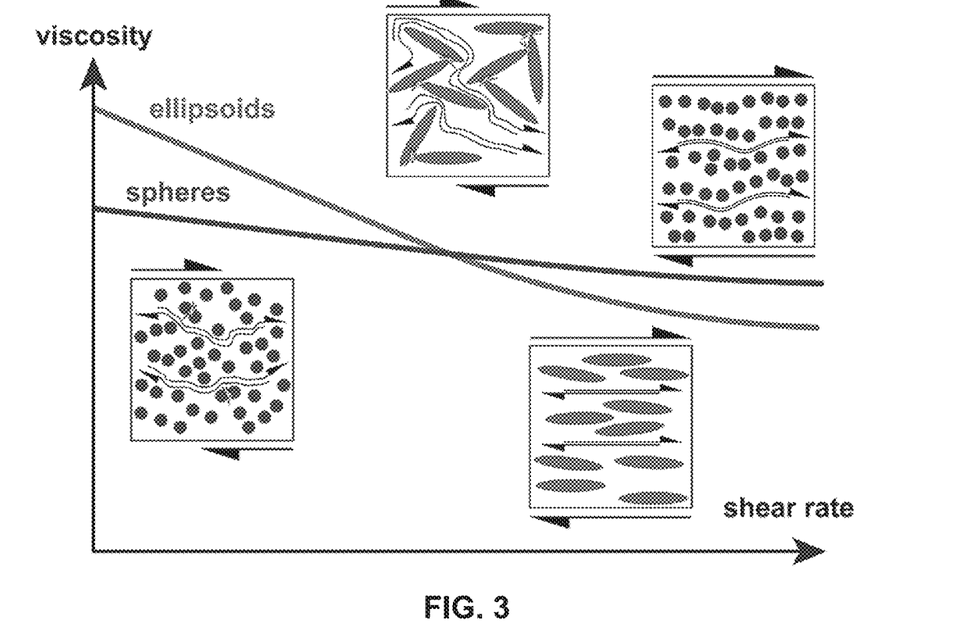
FIG. 3 schematically illustrates the relationship between shear rate and viscosity for suspensions incorporating particles of different shape.

FIG. 3 illustrates the relationship between dynamic viscosity and shear rate for a suspension including ellipsoid particles compared to that for a suspension including spherical particles. As indicated, while both suspensions show shear-thinning characteristics, suspensions with ellipsoid particles will exhibit higher viscosity at low shear rates as compared to suspensions with spherical particles, but the change in viscosity with shear rate will be greater for suspensions of elliptical particles. Thus, through selection of the aspect ratio of the particular particles to be incorporated into a suspension, further control of the rheological properties of the suspension can be provided. For instance, by incorporation of an elliptical particle, increased drop in viscosity with change in shear rate can be obtained as compared to incorporation of spherical particles.

In some embodiments, particles of a suspension as disclosed herein can have an aspect ratio R (length:width) of from 1:1 to about 50:1, for instance, from 1:1 to about 20:1 in some embodiments. Moreover, different particles of a suspension can vary with regard to aspect ratio, e.g., one particle type being generally spherical and another having an aspect ratio of greater than 1:1, or different types of particles having aspect ratios of greater than 1:1 but having different aspect ratios from one another. In some embodiments, particles of the same type can vary with regard to shape. For instance, a particle type exhibiting a desired PZC can be present in a suspension with multiple different shapes and/or sizes.

Figure 4:
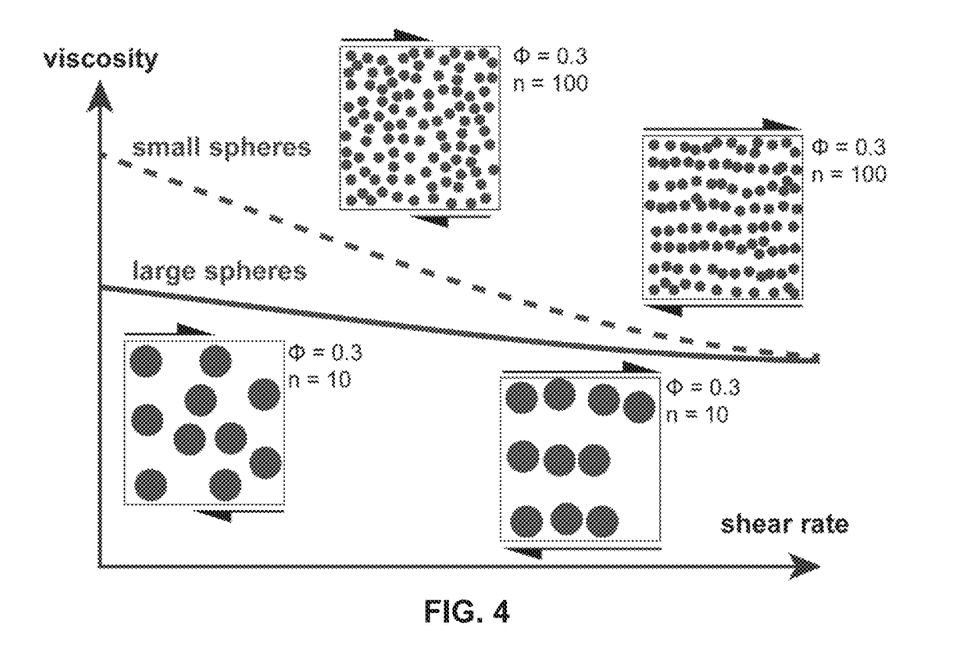
FIG. 4 schematically illustrates the relationship between shear rate and particle size for suspensions incorporating particles of different sizes.

In one embodiment, further control of the rheological characteristics can be provided through selection of the size of the particles to be included in the suspension. As is known, different particle size leads to different total particle surface area for a constant solid fraction of a suspension. FIG. 4 illustrates the relationship between dynamic viscosity and size of spherical particles for suspensions having identical solid fraction ($\phi$). As indicated, both large and small particles show shear-thinning characteristics in a non-Newtonian suspension, but the decrease in viscosity with shear rate is more pronounced for a suspension of small spheres than for a suspension of larger spheres.

Figure 5:
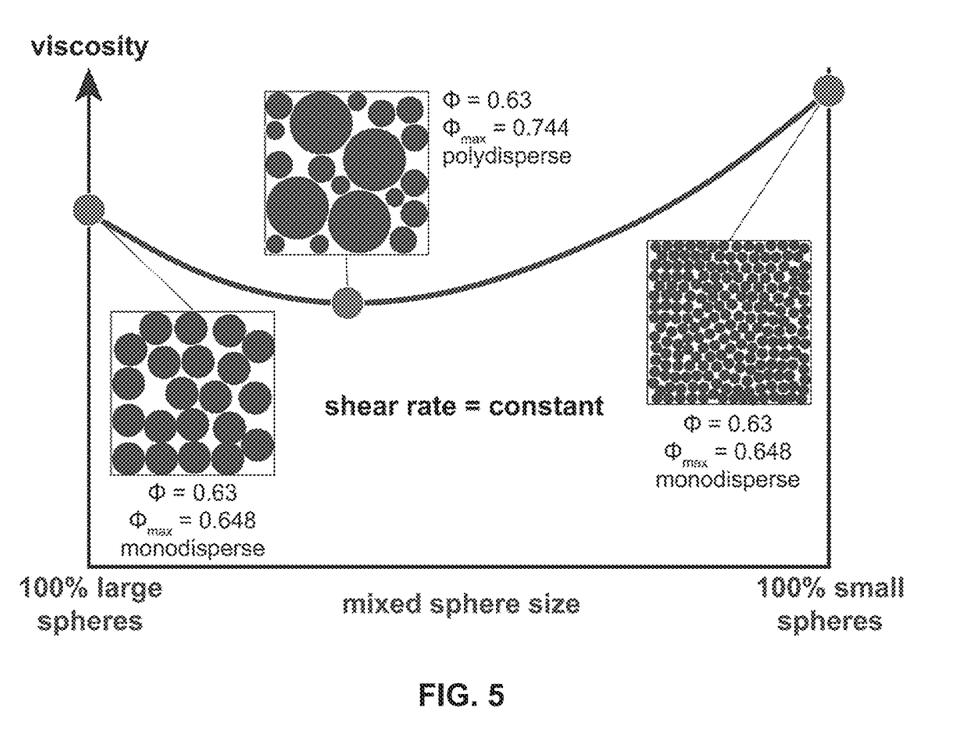
FIG. 5 schematically illustrates the relationship between dispersity of a suspension and viscosity of a suspension at a constant shear rate.

In addition, as indicated in FIG. 4 and FIG. 5, at a constant solid fraction and shear rate, a suspension including smaller spherical particles will exhibit a higher viscosity as compared to a suspension including larger spherical particles. In comparison, and as indicated in FIG. 5, a polydisperse suspension will generally exhibit a higher $\phi_{max}$. At constant solid fraction and shear rate, ($\phi/\phi_{max}$) decreases and this results in a lower viscosity for polydisperse suspensions as compared to monodisperse suspensions at the same shear rate and solid fraction. Thus, through selection of the size of the particular particles and combinations of sizes of particles to be incorporated into the suspension, further control of the rheological properties of the suspension can be provided. For instance, by incorporation of smaller particles and/or polydisperse particles, either of the same or different materials of formation, an increased drop in viscosity with a change in shear rate can be obtained as compared to incorporation of larger, monodisperse particles.

In some embodiments, particles of a suspension as disclosed herein can be nanostructures, i.e., having a largest cross-sectional dimension of about 1.5 micrometers or less, e.g., from about 2 nanometers to about 1 micrometer in some embodiments, such as about 5 nanometers or larger, or about 10 nanometers or larger in some embodiments.

The concentration of particles in the suspension, represented by the solid fraction of the particles in the suspension, can also be utilized to further control the rheological characteristics of a non-Newtonian material. As is known, the presence of particles in a liquid act as obstacles and generally hinder the liquid's flow, thereby increase the viscosity generally described by the following:

$$\eta=\eta_0(1+(5/2)\varphi)$$

in which
  $\eta$ is the bulk viscosity of the suspension,
  $\eta_0$ is the viscosity of the liquid, and
  $\varphi$ is the solid fraction.

When considering a monodisperse suspension having a maximum solid fraction of from about 15 vol. % to about 20 vol. %, the effect of the solid fraction on the viscosity of a suspension has been described as follows:

$$\eta=\eta_0(1+2.5\varphi+6.2\varphi^2)$$

In any case, the rheological properties of a non-Newtonian material can be further modified through control and selection of the total solid fraction (i.e., concentration) of particles within a suspension. In general, the total solid fraction of a suspension can be from about 1 vol. % to about 70 vol. %, such as about 60 vol. % or less, or about 50 vol. % or less in some embodiments.

In some embodiments, in addition to controlling the rheological characteristics of the material, the method can also include controlling the mechanical characteristics of the material. For instance, consistency index, K, of a non-Newtonian material, which represents the mechanical characteristics of the material, can be modified through modification of the concentration of one or both of the particles of the suspension. By way of example, in some embodiments, the concentration of the particles can be controlled such that the thinning characteristics of the suspension are increased as compared to the non-Newtonian material alone, while the consistency index of the suspension remains essentially the same (i.e., of the same order and within a factor of 10) as that of the non-Newtonian material.

A non-Newtonian material as can be the basis for a control method as disclosed is not particularly limited and can generally be defined as a material that follows the power law model:

$$\tau=K\dot{\gamma}^n$$

in which
  K is the consistency index,
  n is the power index: n,
  $\dot{\gamma}$ is the shear strain, and
  $\tau$ is the shear stress.

By way of example, and without limitation, non-Newtonian materials encompassed herein can include fluids, suspensions, gels, etc. such as, and without limitation to, aqueous or non-aqueous suspensions, polymer solutions and polymer melts, foams, drilling muds, fracturing fluids, paraffinic oils, heavy crude oils, Bingham plastics, and the like. In those embodiments in which the non-Newtonian material is a suspension, a method can include adding a second, different particle to the pre-existing suspension. In those embodiments in which the non-Newtonian material is particle-free, e.g., a polymer melt or the like, the method can include adding both a first and second, different particle having a different PZC from the first particle, to the non-Newtonian material.

Similarly, the particles incorporated into a suspension of the non-Newtonian materials are not particularly limited, save that the PZCs of the particles should differ by about 1 or greater in the suspension, such as about 2 or greater, or 3 or greater in some embodiments. For instance, when considering a method for rheological control of an aqueous or non-aqueous suspension in which the non-Newtonian suspension already includes a particle of a known PZC, a second particle can be added to the suspension, with the second particle exhibiting a PZC that differs from that of the first particle, e.g., by about 1 or greater.

In one embodiment, a suspension can include cellulose nanocrystals (CNCs), which exhibit a PZC of about 7 in water. CNCs have many interesting applications with excellent colloidal stability, high tensile stress and stiffness, large surface area, and potential for modification because of the abundance of surface hydroxyl groups. They have a wide range of applications and can generally be divided into four categories: 1) zero-dimensional nanostructure such as may be utilized for drug delivery; 2) one-dimensional fiber structures which can be utilized for enhanced strength as an additive to a composition; 3) two-dimensional films which can exhibit beneficial flexibility; and 4) three-dimensional hydrogels and aerogels. In the majority of these applications, rheological properties are playing an important role.

CNC nanostructures as may be incorporated in a suspension can, in some embodiments, exhibit an aspect ratio of greater than 1. For instance, CNC of a suspension as described can have a width of from about 3 nanometers to about 50 nanometers and a length from about 50 nanometers to about 1.5 micrometers.

Other particles having a PZC of around 7 (e.g., between about 6.5 and about 7.5) are also encompassed herein such as $Fe_2O_3$, $Mn(OH)_3$, goethite, etc.

Particle types as may be included in a suspension can include those considered to be low PZC materials having a PZC of less than about 7, such as, without limitation, $SiO_2$ (PZC~3), $TiO_2$ (PZC~4), clays (kaolin (PZC~3), albite (PZC~2), bentonite (PZC~3), illite (PZC~2.5), montmorillonite (PZC~2-6)), $SnO_2$ (PZC~5), $UO_2$ (PZC~6), $WO_2$ (PZC~0.5), $ZrO_2$ (PZC~5), $CeO_2$ (PZC~6), $CaF_2$ (PZC~3), AgI (PZC~5), AgCl (PZC~4), $MnO_2$ (PZC~4), Ag (PZC~3), carbon nanostructures (fullerenes (PZC~2), multiwalled nanotubes (PZC~5), single-walled nanotubes (PZC~5)), or any combination thereof.

Particle types as may be included in a suspension can include those considered to be high PZC materials having a PZC of greater than about 7, such as, without limitation, $Al_2O_3$ (PZC~9), $Fe(OH)_3$ (PZC~9), ZnO (PZC~9), NiO (PZC~10), MgO (PZC~11), calcite (PZC~10), magnetite (PZC~8), or any combination thereof.

Disclosed methods can provide for low-cost, simple rheological tuning of the rheological behavior of suspensions and can be beneficially utilized in a variety of industries including, without limitation, oil drilling and recovery, thin film and packaging formation, and the energy and electronic sector, as well as in 3D printing applications.

The disclosure may be better understood with reference to the Examples, set forth below.

EXAMPLE 1

A suspension including cellulose nanocrystals (CNCs, PZC~7) in water was formed. $TiO_2$ nanoparticles (PZC~4) were added. At pH values above 7, both surfaces of CNCs and $TiO_2$ particles were negatively charged, and the electrostatic repulsive forces changed the rheological behavior of the fluid (FIG. 2, left).

At pH values between 4 and 7, the $TiO_2$ particles were negatively charged at the surface. However, the CNC surfaces were positively charged, which provides some attraction forces (FIG. 2, right) and consequently changed the rheological behavior of the suspension.

EXAMPLE 2

Figure 6:
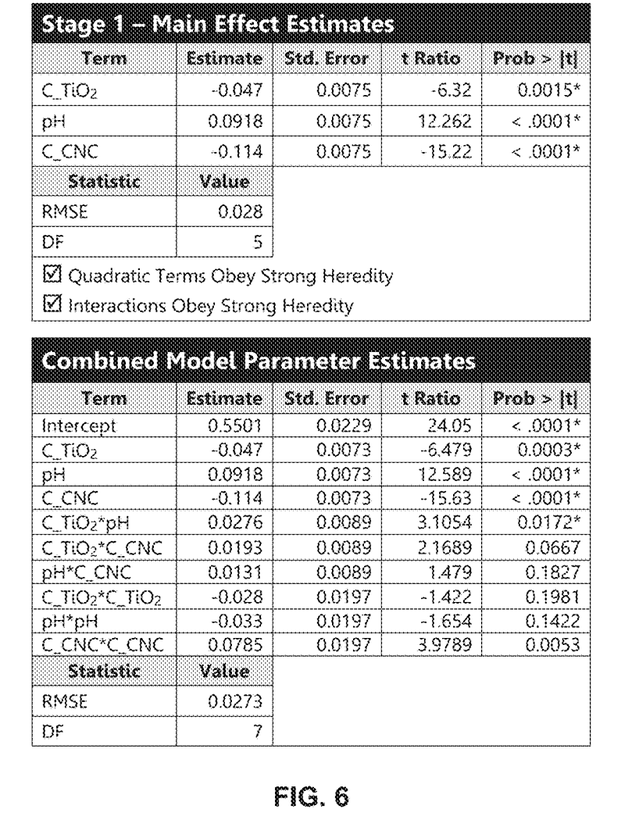
FIG. 6 illustrates estimates utilized in an example set forth herein.
Figure 7:
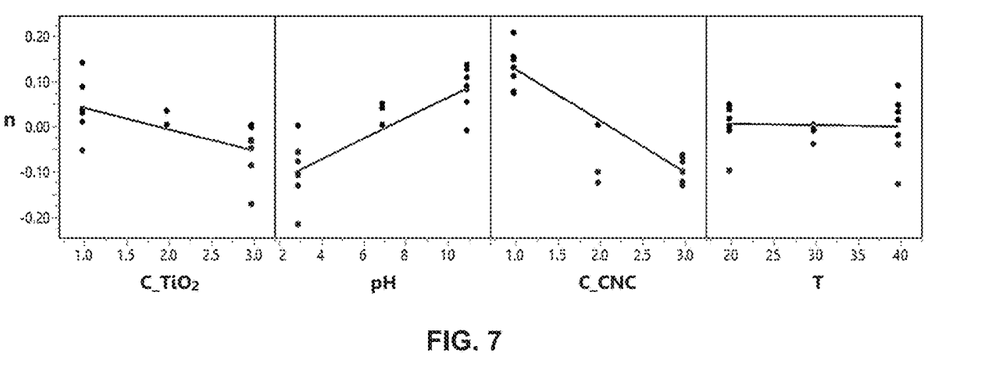
FIG. 7 illustrates the effect of various parameters on the power index of a non-Newtonian suspension.
Figure 8:
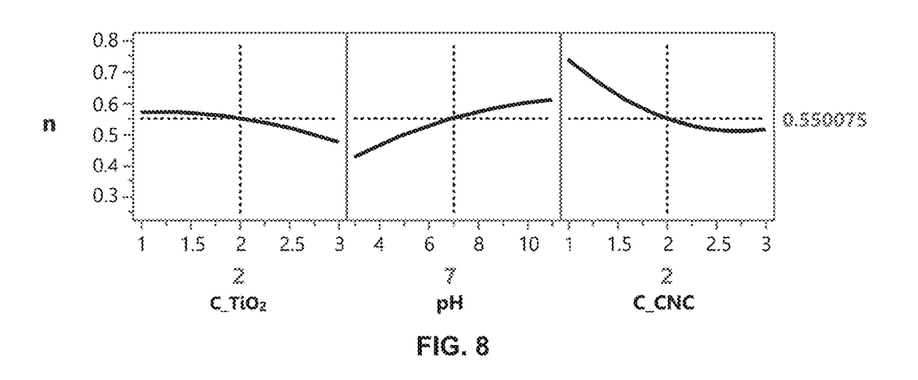
FIG. 8 illustrates an expanded view of the effect of particle concentrations and pH on the power index of a non-Newtonian suspension.
Figure 9:
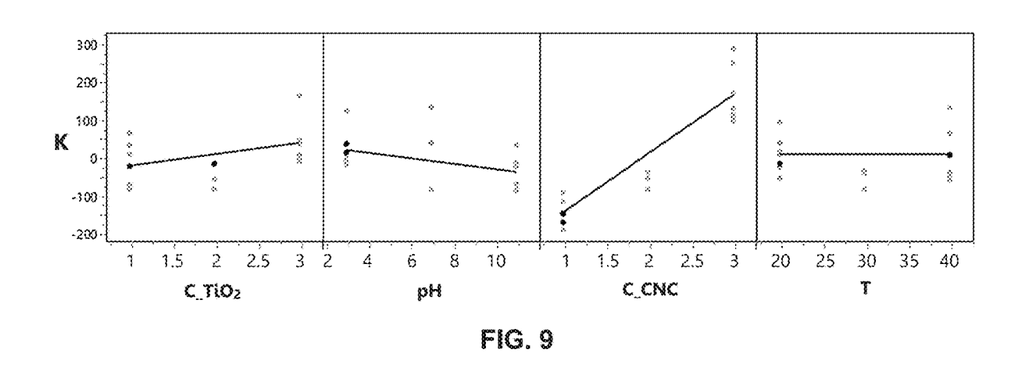
FIG. 9 illustrates the effect of various parameters on the consistency index of a non-Newtonian suspension.
Figure 10:
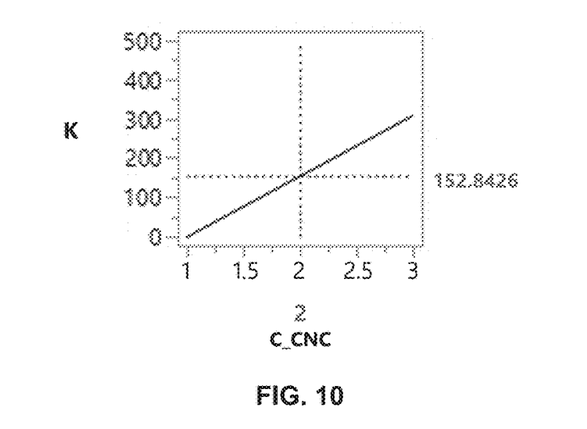
FIG. 10 illustrates an expanded view of the effect of cellulose nanocrystal (CNC) concentration on the consistency index of a non-Newtonian suspension.

A design of experiment (DOE) was carried out on a $CNC/TiO_2$ non-Newtonian aqueous suspension using statistical approaches and regression of the data using the power-law model as defined above ($\tau=K\dot{\gamma}^n$) to evaluate the effect of each parameter (pH, temperature, $TiO_2$ concentration, CNC concentration) on the power index, n (representing non-Newtonian behavior), and the consistency index, K (representing mechanical properties), of the suspensions. FIG. 6 presents the estimates utilized in the DOE.

FIG. 7, FIG. 8, FIG. 9, and FIG. 10 illustrate results of the DOE. As indicated, pH changes resulted in a change in the non-Newtonian behavior of the suspensions. In addition, the change in concentration of $TiO_2$ and CNC (consequently, to some extent, PZC) altered the non-Newtonian behavior of the suspensions. Also, a change in pH did not lead to a significant change in the mechanical properties of the suspension, but variation in the concentration of the CNC can be used to alter the mechanical properties.

Overall, the DOE indicated that pH level can be used to change the rheological behavior of the suspensions without a statistically significant change in mechanical properties of the suspension. In other words, the pH could induce changes in rheological behavior while maintaining the mechanical properties.

EXAMPLE 3

Suspensions of CNC, $TiO_2$, and combinations thereof were examined for effect of concentration of the rheological behavior of the suspensions as compared to the base fluid (water).

Figure 11:
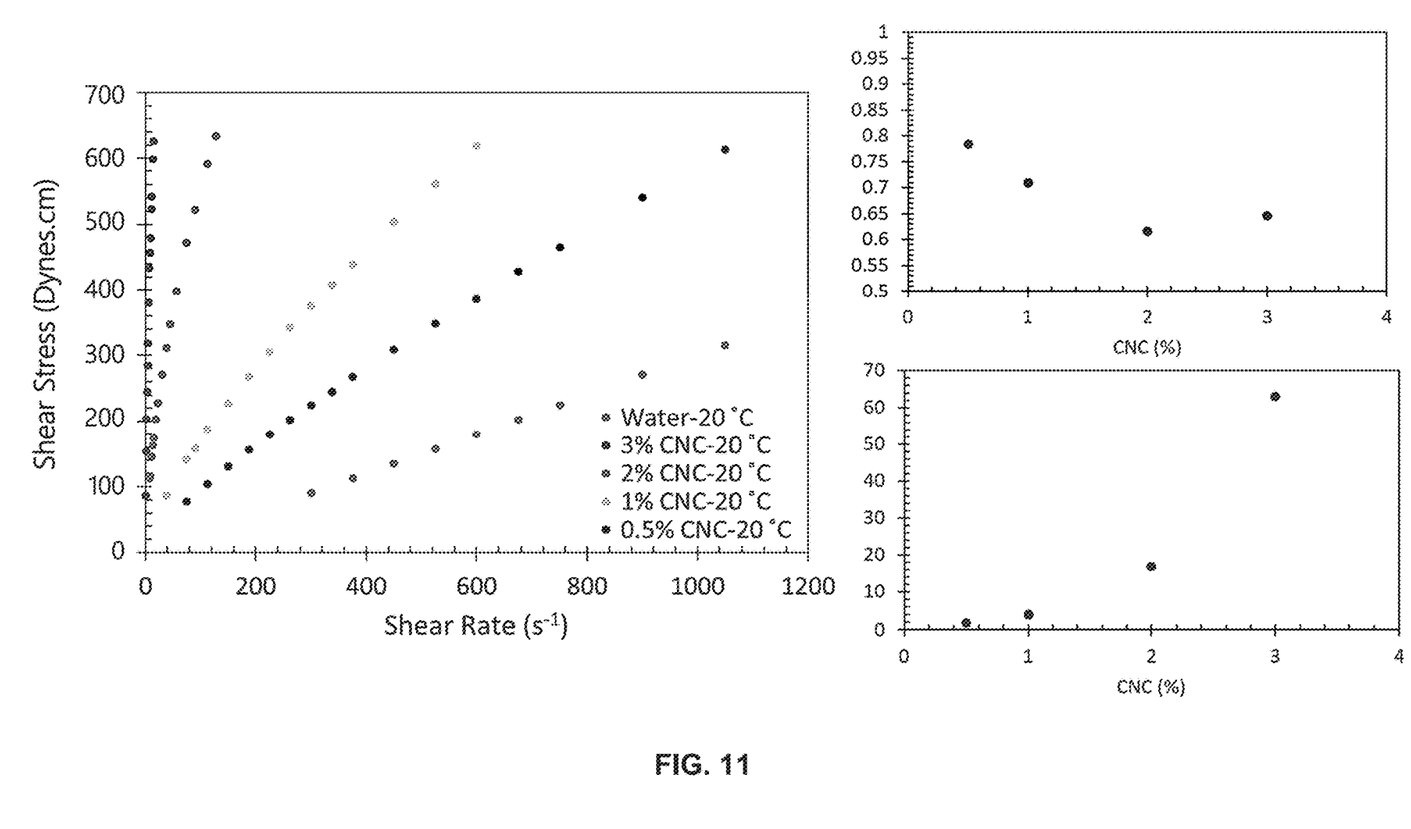
FIG. 11 illustrates the rheological behavior of different concentrations of CNC aqueous suspensions as compared to water.
Figure 12:
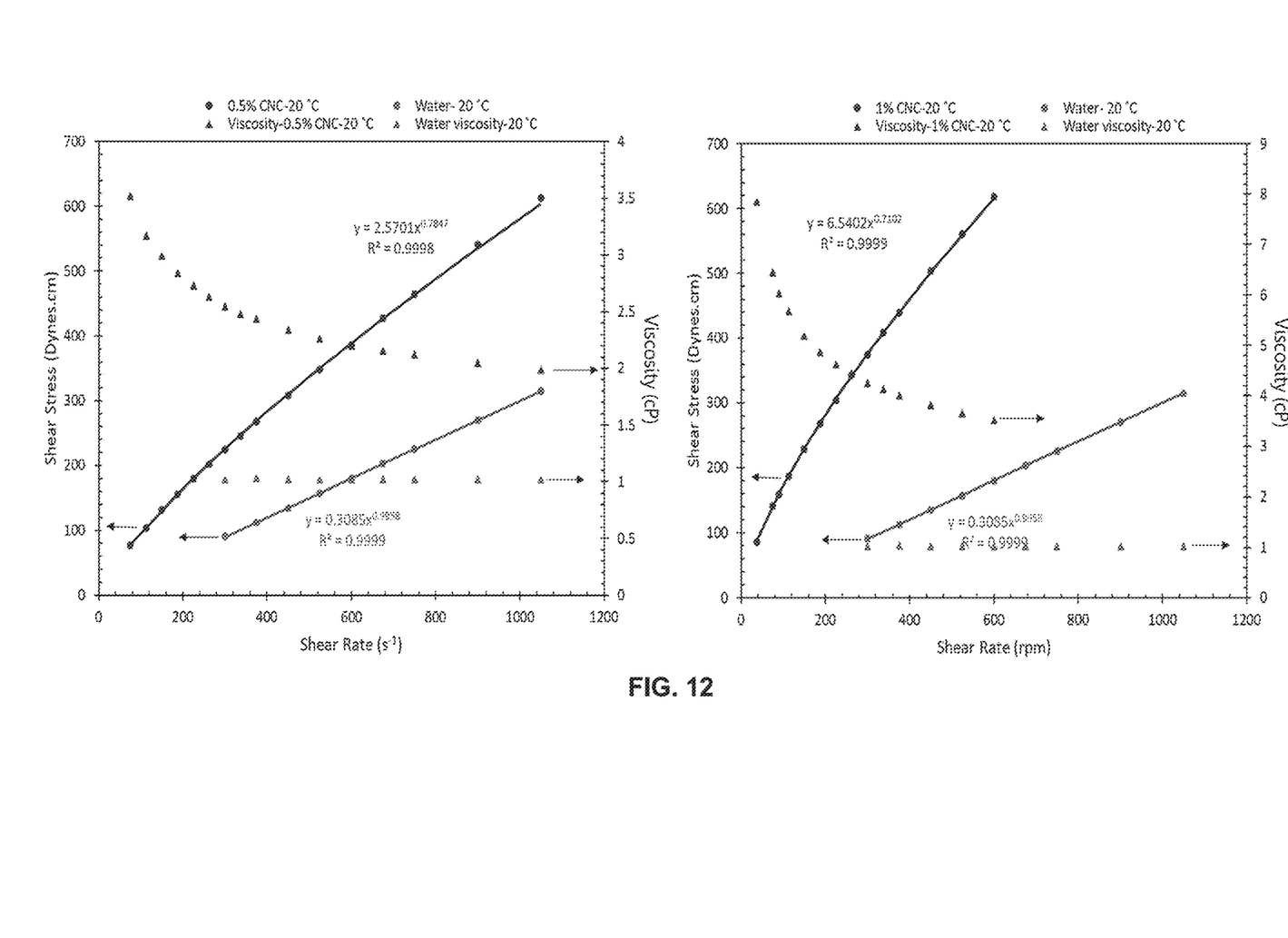
FIG. 12 illustrates the rheological behavior of 0.5 wt. % and 1 wt. % CNC aqueous suspensions as compared to water.
Figure 13:
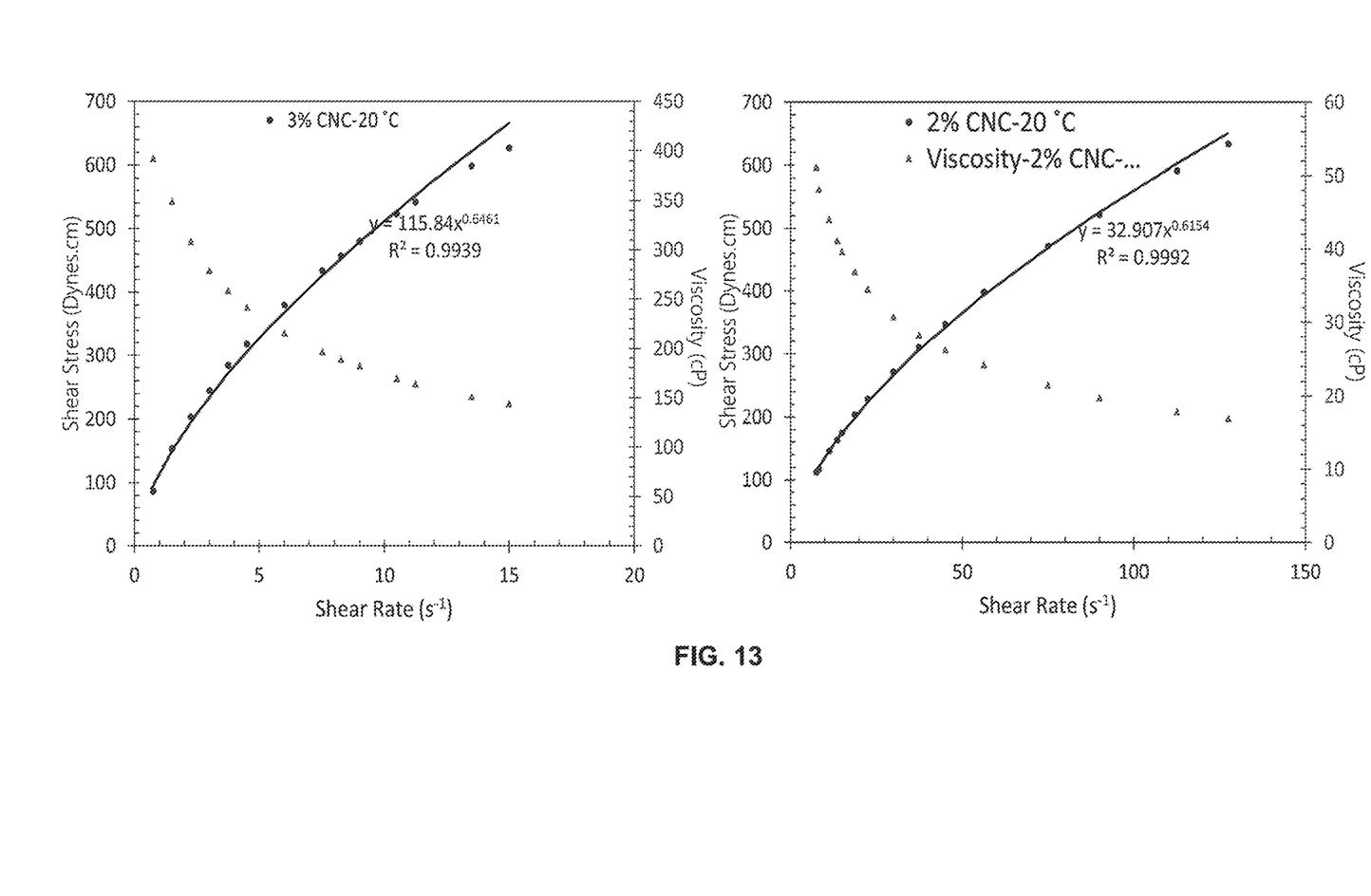
FIG. 13 illustrates the rheological behavior of 3 wt. % and 2 wt. % CNC aqueous suspensions.

FIG. 11 illustrates comparison of the rheological behavior of water with several different suspensions of CNC particles including 0.5 wt. % CNC, 1 wt. % CNC, 2 wt. % CNC, and 3 wt. % CNC. Results include variation in shear stress with shear rate, differences in power index, and differences in consistency index. FIG. 12 presents the shear stress vs. shear rate comparison of the 0.5 wt. % CNC suspension with water (left) and the 1 wt. % CNC suspension with water (right). FIG. 13 presents the shear stress vs. shear rate data for the 3 wt. % CNC suspension (left) and the 2 wt. % CNC suspension (right).

Figure 14:
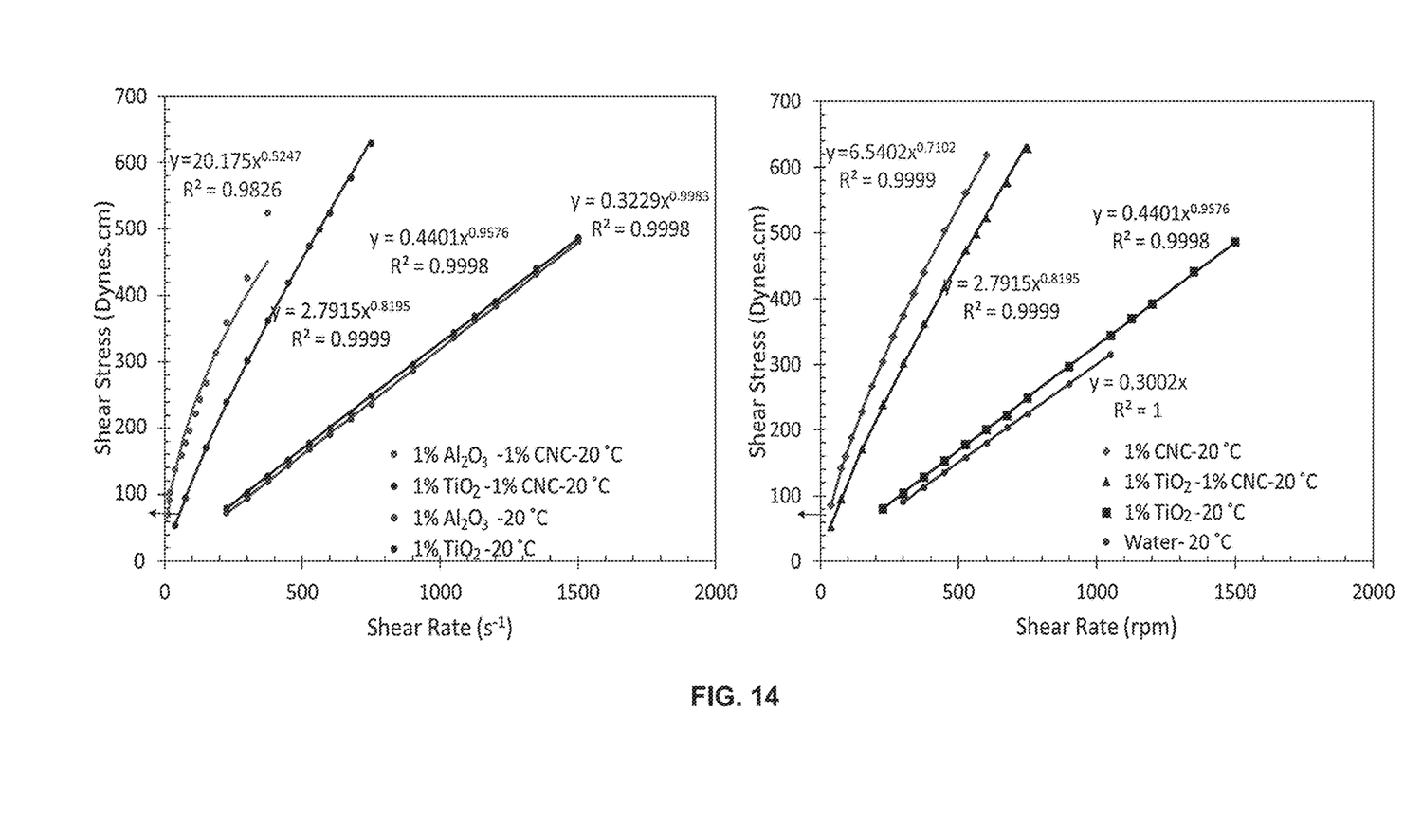
FIG. 14 provides rheological characteristics of aqueous suspensions including $TiO_2$ particles, CNC particles, $Al_2O_3$ particles, and combinations thereof and compares the suspensions with water.

FIG. 14 illustrates rheological characteristics of suspensions that include water only, 1 wt. % $TiO_2$, 1 wt. % CNC, 1 wt. % $TiO_2$ with 1 wt. % CNC, 1 wt. % $Al_2O_3$, and 1 wt. % $Al_2O_3$ with 1 wt. % CNC.

Figure 15:
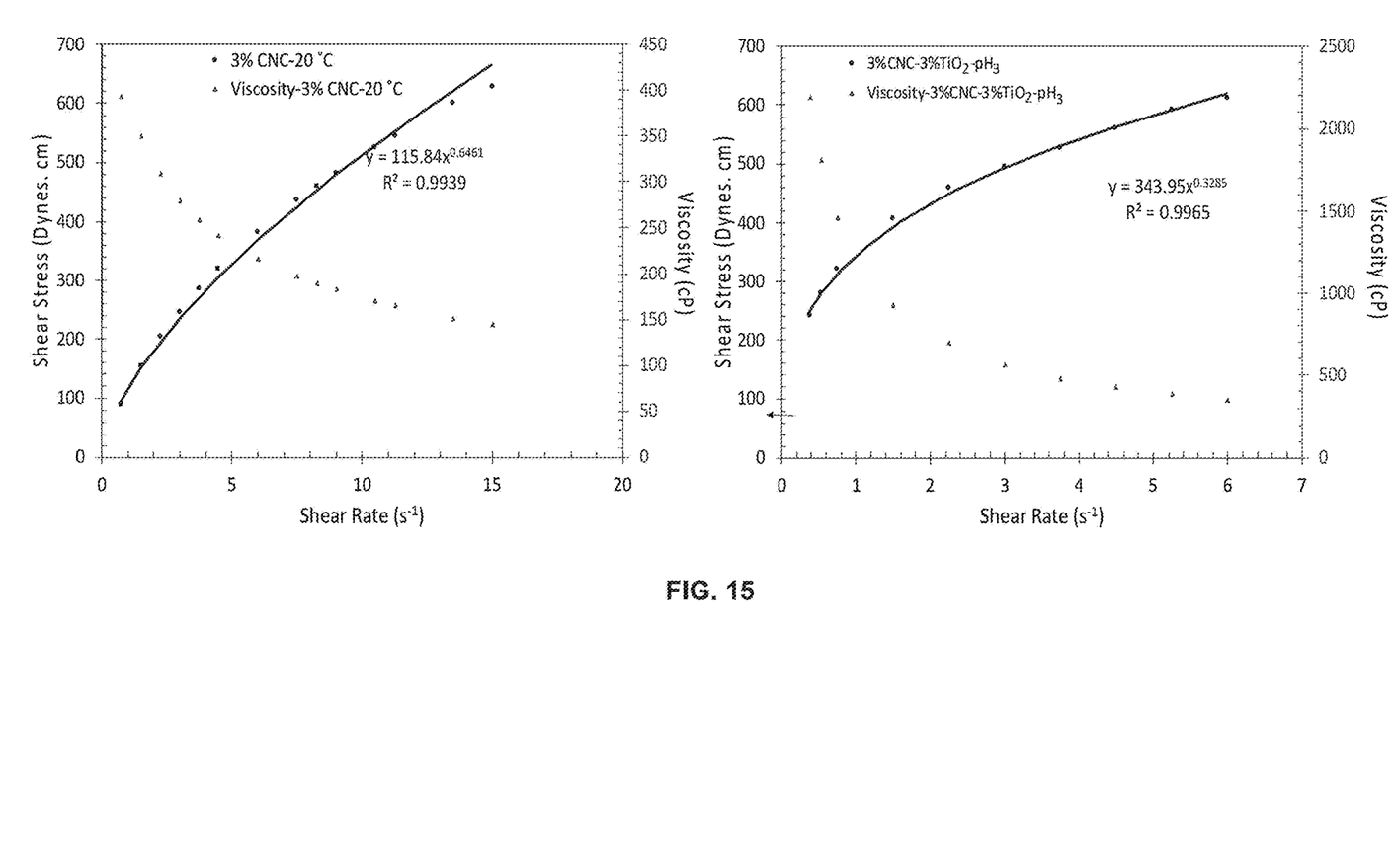
FIG. 15 illustrates the improved shear-thinning rheological behavior of a suspension including both CNC and $TiO_2$ particles at pH 3 as compared to a suspension including only CNC particles.

FIG. 15 illustrates the improved shear-thinning effect of inclusion of both CNC and $TiO_2$ particles in a suspension (3 wt. % each at pH 3) as compared to a suspension that contains only the CNC at 3 wt. %.

While certain embodiments of the disclosed subject matter have been described using specific terms, such description is for illustrative purposes only, and it is to be understood that changes and variations may be made without departing from the spirit or scope of the subject matter.

What is claimed is:

1. A method for controlling a rheological characteristic of a non-Newtonian material, the method comprising:
combining a first particle with a first suspension to form a second suspension, the first suspension comprising the non-Newtonian material, the first suspension comprising a second particle, the first particle having a first point of zero charge and the second particle having a second, different point of zero charge; and
adjusting a pH of the first suspension or the second suspension such that the pH of the second suspension is greater than the first point of zero charge and the second point of zero charge or such that the pH of the second suspension is less than the first point of zero charge and the second point of zero charge, wherein upon the pH adjustment, the second suspension exhibits a change in shear-thinning behavior as compared to the shear-thinning behavior of the non-Newtonian material.

2. The method of claim 1, wherein the non-Newtonian material is the first suspension, the non-Newtonian material comprising a fluid and the second particle.

3. The method of claim 2, wherein the fluid is a Newtonian fluid.

4. The method of claim 2, wherein the first suspension is an aqueous suspension.

5. The method of claim 1, further comprising combining the second particle with the non-Newtonian material to form the first suspension.

6. The method of claim 1, wherein the first particle or the second particle comprises cellulose nanocrystals.

7. The method of claim 1, wherein one or both of the first particle and the second particle have a point of zero charge of between about 6.5 and about 7.5.

8. The method of claim 1, wherein one or both of the first particle and the second particle are low point of zero charge materials.

9. The method of claim 1, wherein one or both of the first particle and the second particle are high point of zero charge materials.

10. The method of claim 1 wherein one or both of the first particle and the second particle have an aspect ratio of length:width of greater than 1:1.

11. The method of claim 1, wherein the second suspension is a polydisperse suspension.

12. The method of claim 1, wherein the second suspension is a monodisperse suspension.

13. The method of claim 1, wherein the first particles and/or the second particles are nanostructures having a largest dimension of from about 2 nanometers to about 1.5 micrometers.

14. The method of claim 1, wherein the second suspension as a total solid fraction of from about 1 vol. % to about 70 vol. %.

15. The method of claim 1, wherein the consistency index of the second suspension is within a factor of 10 of the consistency index of the non-Newtonian material.

16. The method of claim 1, wherein following the pH adjustment, upon application of shear rates of 1 $s^{-1}$ and 5 $s^{-1}$ to the second suspension a first change in dynamic viscosity (cP) is obtained and upon application of shear rates of 1 $s^{-1}$ and 5 $s^{-1}$ under the same conditions to the non-Newtonian material a second change in dynamic viscosity (cP) is obtained, wherein the first change in dynamic viscosity is about 10% or greater than the second change in dynamic viscosity.

17. The method of claim 16, wherein the first and second changes in dynamic viscosity are decreases in dynamic viscosity.

* * * * *